UNITED STATES PATENT OFFICE.

WILHELM BAUER, OF VOHWINKEL, NEAR ELBERFELD, AND ALFRED HERRE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

TRIBROMINDIGO AND PROCESS OF MAKING SAME.

937,040.      Specification of Letters Patent.      Patented Oct. 19, 1909.

No Drawing.      Application filed September 15, 1908. Serial No. 453,163.

*To all whom it may concern:*

Be it known that we, WILHELM BAUER and ALFRED HERRE, doctors of philosophy, chemists, citizens of the German Empire, residing at Vohwinkel, near Elberfeld, and Elberfeld, Germany, respectively, have invented new and useful Improvements in Tribromoindigo and Processes of Making Same, of which the following is a specification.

Our invention relates to the manufacture and production of a new tribromo substitution product of indigo. It is obtained in a very simple manner and with a very good yield by treating at a moderate temperature in presence of concentrated sulfuric acid indigo with bromin. The new tribromo derivative of indigo thus obtained is a valuable dyestuff. It forms "vats" by the usual methods in use for preparing indigo vats. These "vats" dye unmordanted cotton greenish-blue shades remarkable for their clearness and fastness.

The new tribromoindigo is distinguished from the tribrominated indigo of the old art by yielding more greenish shades than the tribrominated indigo of the old art; it is also more soluble in organic solvents and its leuco compound is more soluble in alkalies. It is soluble in hot glacial acetic acid and easily soluble in hot phenol and benzaldehyde with a blue color. By treatment with oxidizing agents our new compound furnishes a product from which a bromoisatin of the melting point of about 215° C. may be isolated while the product furnished by the oxidation of the tribromoindigo of the old art consists of bromoisatins melting at about 250° C.

In order to illustrate the new process more fully the following examples are given, the parts being by weight.

Example I: 10 parts of finely powdered indigo are gradualy introduced while stirring into 250 parts of concentrated sulfuric acid (66° Bé.), which has to be cooled to prevent sulfonation of the indigo. 18 parts of bromin are then added in such a manner that its addition takes about half an hour. After stirring the mixture for two hours it is heated to 30° C. and it is then kept at this temperature for three hours, while the stirring is continued all the time. Subsequently the mixture is poured into water containing a small quantity of bisulfite and the new tribromoindigo which separates is filtered off, treated with a dilute solution of caustic alkali at 80° C., filtered again, washed with warm water, and dried. It is a reddish-blue powder, soluble in concentrated sulfuric acid with a greenish-blue color.

When treated with alkaline reducing agents *e. g.* hydrosulfite and NaOH the new tribromoindigo yields a yellow vat containing the leuco compound from which unmordanted cotton is dyed in greenish-blue shades, which on being touched with concentrated nitric acid behave very similar to shades produced with indigo, namely a yellow spot appears with a greenish circle around it, while the shade of the tribromoindigo of the old art turns slowly greenish-gray with concentrated nitric acid.

It is not necessary to use in the above example the theoretical amount of bromin because the hydrogen bromid, formed during the reaction, is oxidized by the sulfuric acid, and will supply the bromin necessary for the completion of the reaction. We can, therefore, carry out our process with a considerably smaller amount of bromin than theoretically calculated.

Example II: 10 parts of finely powdered indigo are gradually introduced while stirring into 250 parts of concentrated sulfuric acid (66° Bé.), which has to be cooled to prevent sulfonation of the indigo. 12 parts of bromin are then added in such a manner that its addition takes about half an hour. After stirring the mixture for two hours it is heated to 30° C. and it is then kept at this temperature for three hours, while the stirring is continued all the time. Subsequently the mixture is poured into water containing a small quantity of bisulfite and the new tribromoindigo which separates is filtered off, treated with a dilute solution of caustic alkali at 80° C., filtered again, washed with warm water, and dried.

We have further found that the bromination of indigo can also be carried out by using hydrobromic acid (HBr) alone, and we found that even bromid of sodium or other bromids can be employed directly in the presence of sulfuric acid.

Example III: 10 parts of indigo are introduced into 300 parts of sulfuric acid (66° Bé.) cooled to from 5 to 10° C. below 0° and 40 parts of powdered sodium bromid (NaBr) are added at this temperature. The mixture is stirred for 20 hours, the temperature being allowed to rise in the course of 15 hours to 45° C. It is kept at this temperature for a further 5 hours and is then poured onto ice. The tribromoindigo which separates is filtered off and dried.

The new dye can also be obtained by starting instead of from indigo, from bromoindigo containing a lower percentage of bromin than the tribromoindigo.

Having now particularly described and ascertained the nature of our invention and in what manner the same is to be performed, we declare that what we claim is:—

1. The herein-described process for producing tribromoindigo, which process consists in treating indigo substances with brominating agents and concentrated sulfuric acid in the absence of water, substantially as described.

2. The herein-described process for producing tribromoindigo, which process consists in treating indigo substances with bromin and concentrated sulfuric acid in the absence of water, substantially as described.

3. The herein-described new tribromoindigo obtainable by treating indigo in the presence of concentrated sulfuric acid with bromin, which product is a reddish-blue powder, soluble in concentrated sulfuric acid with a greenish-blue color, soluble in hot glacial acetic acid and easily soluble in hot phenol and benzaldehyde with a blue color; furnishing by treatment with oxidizing agents a product from which a bromoisatin melting at 215° C. may be isolated; and yielding by treatment with hydrosulfite and caustic soda lye a yellow vat, from which unmordanted cotton is dyed greenish-blue shades, which turn quickly yellow when touched with concentrated nitric acid, substantially as described.

In testimony whereof we have hereunto set our hands in the presence of two subscribing witnesses.

WILHELM BAUER. [L. S.]
ALFRED HERRE. [L. S.]

Witnesses:
OTTO KÖNIG,
WM. WASHINGTON BRUNSWICK.